US009014981B1

(12) United States Patent
Gray et al.

(10) Patent No.: US 9,014,981 B1
(45) Date of Patent: Apr. 21, 2015

(54) DETERMINING BOOK CHARACTERISTICS BASED ON TEXT SECTIONS

(75) Inventors: Matthew K. Gray, Reading, MA (US); Yuan Kui Shen, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 764 days.

(21) Appl. No.: 13/296,212

(22) Filed: Nov. 14, 2011

(51) Int. Cl.
*G01D 21/00* (2006.01)
*G06F 17/00* (2006.01)
*G06F 19/00* (2011.01)
*G06F 17/27* (2006.01)

(52) U.S. Cl.
CPC .................................. *G06F 17/2785* (2013.01)

(58) Field of Classification Search
CPC ............. B42D 7/00; G01D 1/00; G01D 7/00; G01D 9/00; G01D 21/00; G06F 11/00; G06F 11/30; G06F 11/1132; G06F 11/34; G06F 15/00; G06F 15/16; G06F 17/00; G06F 17/10; G06F 17/20; G06F 17/21; G06F 17/30; G06F 17/3061; G06F 17/40; G06F 19/00
USPC .......... 73/432.1, 865.8, 865.9, 866.3; 283/44, 283/46, 48.1, 63.1; 462/84; 702/1, 127, 702/179, 180, 181, 182, 187, 189; 708/100, 708/105, 200
See application file for complete search history.

(56) References Cited

U.S. PATENT DOCUMENTS

| | | | | |
|---|---|---|---|---|
| 6,236,980 | B1 * | 5/2001 | Reese | 705/36 R |
| 8,781,989 | B2 * | 7/2014 | Duchon | 706/52 |
| 2010/0280985 | A1 * | 11/2010 | Duchon et al. | 706/52 |
| 2011/0106743 | A1 * | 5/2011 | Duchon | 706/46 |

OTHER PUBLICATIONS

Culturomics, "Google N-Gram Viewer," 2 pages [online] [retrieved on May 1, 2012] Retrieved from the internet <URL:www.culturomics.org/Resources/A-users-guide-to-culturomics>.
De Jong, F., et al., "Temporal Language Models for the Disclosure of Historical Text," AHC Proceedings of the XVI international conference of the Association for History and Computing, Sep. 14-17, 2005, pp. 161-168.
Google Inc., "Google books Ngram Viewer" 2010, 3 pages [online] [retrieved on May 1, 2012] Retrieved from the internet <URL:books.google.com/ngram/info>.
Michel, J.-B., et al., "Quantitative Analysis of Culture Using Millions of Digitized Books," Science Magazine, Jan. 14, 2011, pp. 176-182, vol. 331.
Kanhabua, N., et al., "Improving Temporal Language Models for Determining Time of Non-Timestamped Documents," ECDL, 2008, pp. 358-370, LNCS 5173.

* cited by examiner

*Primary Examiner* — Edward Cosimano
(74) *Attorney, Agent, or Firm* — Fenwick & West LLP (57) ABSTRACT

Characteristics of a book are determined. A plurality of maximum-likelihood dates associated with text pages within the book is accessed. A maximum-likelihood date for a text page indicates a time period during which that text page was most likely to have been written. The plurality of maximum-likelihood dates is ordered according to the maximum-likelihood dates' associated text pages, from a first text page for which a maximum-likelihood date is available to a last text page for which a maximum-likelihood date is available. The ordered plurality of maximum-likelihood dates is analyzed according to a heuristic to determine characteristics of the book.

20 Claims, 7 Drawing Sheets

DETERMINING BOOK CHARACTERISTICS BASED ON TEXT SECTIONS

BACKGROUND

1. Field of Art

The invention generally relates to the field of textual analysis and in particular to determining characteristics of a book by analyzing text of the book on a section-by-section basis.

2. Background Information

A temporal language model can calculate the probability that a sequence of m words $P(w_1, \ldots, w_m)$ was written during a particular time period. This probability can be represented as P(timePeriod|text), where text is the sequence of m words $(w_1, \ldots, w_m)$ and timePeriod is the particular time period (e.g., the 1950s). An example application of temporal language models is the dating of texts. Given a date-tagged reference corpus (consisting of documents from a particular time period) and a document X with unknown date (within the same time period), a text-dating system can classify X according to time partitions of predefined granularity (e.g., decades). Temporal language models derived from the corpus capture characteristics of the vocabulary used within particular time periods. A language model is computed from the undated document X and is compared to the temporal language models built from the reference corpus.

Text-dating systems are often used to analyze short documents, such as newspaper articles and web pages. These types of documents usually contain homogeneous language (i.e., language that was written during the same time period). Since the language is homogeneous, the choice of which portion of the document to analyze is usually irrelevant. Long documents, such as entire books, might contain language that is less homogeneous. If a text-dating system is used to analyze such a document, then text from different portions of the document might yield different results, and the choice of which portion of the document to analyze becomes important.

SUMMARY

The above and other issues are addressed by a computer-implemented method, non-transitory computer readable storage medium, and computer system for determining characteristics of a book. An embodiment of the method comprises accessing a plurality of maximum-likelihood dates associated with text pages within the book, wherein a maximum-likelihood date for a text page indicates a time period during which that text page was most likely to have been written. The method further comprises ordering the plurality of maximum-likelihood dates according to their associated text pages, from a first text page for which a maximum-likelihood date is available to a last text page for which a maximum-likelihood date is available; and analyzing the ordered plurality of maximum-likelihood dates according to a heuristic to determine characteristics of the book.

An embodiment of the medium stores executable computer program instructions for determining characteristics of a book. The instructions access a plurality of maximum-likelihood dates associated with text pages within the book, wherein a maximum-likelihood date for a text page indicates a time period during which that text page was most likely to have been written. The instructions further order the plurality of maximum-likelihood dates according to their associated text pages, from a first text page for which a maximum-likelihood date is available to a last text page for which a maximum-likelihood date is available; and analyze the ordered plurality of maximum-likelihood dates according to a heuristic to determine characteristics of the book.

An embodiment of the computer system for determining characteristics of a book comprises at least one non-transitory computer-readable storage medium storing executable computer program instructions. The instructions comprise instructions for accessing a plurality of maximum-likelihood dates associated with text pages within the book, wherein a maximum-likelihood date for a text page indicates a time period during which that text page was most likely to have been written. The instructions further order the plurality of maximum-likelihood dates according to their associated text pages, from a first text page for which a maximum-likelihood date is available to a last text page for which a maximum-likelihood date is available; and analyze the ordered plurality of maximum-likelihood dates according to a heuristic to determine characteristics of the book.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
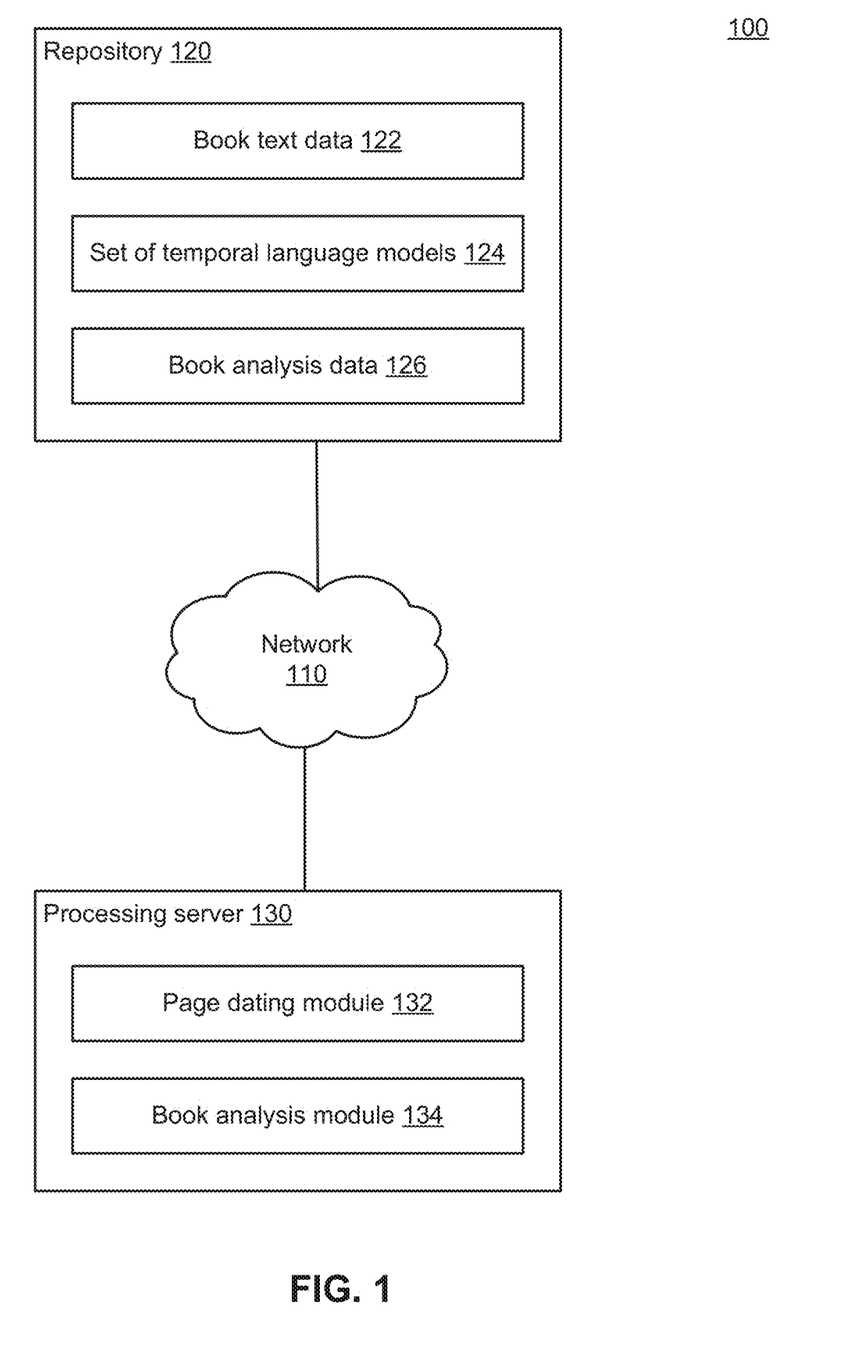
FIG. 1 is a high-level block diagram illustrating an environment for determining characteristics of a book according to one embodiment.

FIG. 1 is a high-level block diagram illustrating an environment 100 for determining characteristics of a book according to one embodiment. The environment 100 may be maintained by an enterprise that analyzes books, such as a corporation, university, or government agency. As shown, the environment 100 includes a network 110, a repository 120, and a processing server 130. While only one of each entity is shown in the embodiment depicted in FIG. 1 for clarity, other embodiments can have multiple repositories 120 and processing servers 130.

The network 110 represents the communication pathway between the repository 120 and the processing server 130. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc.

In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The repository 120 is a computer (or set of computers) that stores book text data 122, a set of temporal language models 124, and book analysis data 126. In one embodiment, the repository 120 includes a server that provides the processing server 130 access to book text data 122, the set of temporal language models 124, and book analysis data 126 in response to requests.

Book text data 122 includes the text of one or more paginated books. As used herein, the term "book" refers to a collection of text. All of the text in the collection may be from a single source, or the collection may contain text from different sources. All of the text in the collection may have been written during the same time period, or the collection may contain text from different time periods. The text may have originated in a traditional paper-based format (e.g., a physical book, magazine, bound pamphlet, or newspaper), or it may have originated in a digital format (e.g., electronic files in a format such as Portable Document Format (PDF)).

The book text is annotated to indicate the number of the page on which each portion of text was present. As used herein, the term "page" refers to a logical division of text, such as a chapter, a section, a traditional page, etc. If text is not paginated (e.g., a digital document such as a web page or a paper scroll), then the concept of pagination extends to token ranges or similar divisions of text. Note that one book can contain page numbers that adhere to different numbering schemes (e.g., lower-case Roman numerals versus Arabic numerals). Lower-case Roman numerals (such as i, ii, iii, etc.) are commonly used for front matter (e.g., forewords or tables of contents), while Arabic numerals (such as 1, 2, 3, etc.) are commonly used for the main body of a book. Also, a single known book can have multiple known paginations (e.g., one pagination based on actual page numbers and other paginations based on other logical divisions of text, such as chapters or sections).

The set of temporal language models (TLMs) 124 includes multiple temporal language models that can be used to help determine when a page of a book (whose text is in book text data 122) was written. A TLM can be used to calculate the probability that a sequence of m words $P(w_1, \ldots, w_m)$ was written during a particular time period. This probability can be represented as P(timePeriod|text), where text is the sequence of m words $(w_1, \ldots, w_m)$ and timePeriod is the particular time period (e.g., the 1950s). Specifically, Bayes' rule is applied to the output of statistical language models as follows:

$$P(timePeriod|text) = P(text|timePeriod)P(timePeriod)/alpha$$

where alpha is a normalization constant (e.g., the sum of all possible enumerations of the numerator). For simplification purposes, assume that P(timePeriod) is uniform.

A statistical language model (SLM) is trained using a quantity of text (e.g., an excerpt from a book) to capture the language usage properties of that text. After a SLM has been trained, it can assign a probability to a sequence of m words $P(w_1, \ldots, w_m)$ by means of a probability distribution. The SLM captures the language usage properties of the time period during which the text was written. For example, a SLM that was trained using books from the 1950s captures the language usage properties of 1950s books and can calculate the probability that a sequence of m words $P(w_1, \ldots, w_m)$ would occur in a 1950s book. This probability can be represented as P(text|timePeriod), where text is the sequence of m words $(w_1, \ldots, w_m)$ and timePeriod is the 1950s. After P(text|timePeriod) has been calculated using a SLM, a TLM applies Bayes' rule as explained above:

$$P(timePeriod|text) = P(text|timePeriod)P(timePeriod)/alpha$$

where alpha is a normalization constant (e.g., the sum of all possible enumerations of the numerator).

An example application of TLMs is the dating of text documents. Given a date-tagged reference corpus (consisting of documents from a particular time period) and a document X with unknown date (within the same time period), a text-dating system can classify X according to time partitions of predefined granularity (e.g., decades). TLMs derived from the corpus capture characteristics of the vocabulary used within particular time periods. A language model is computed from the undated document X and is compared to the TLMs built from the reference corpus.

The set of temporal language models 124 includes TLMs that have been trained to capture characteristics of the vocabulary used in books that were written within a particular time period. Each TLM captures vocabulary characteristics for a different time period. In one embodiment, the time period spans one or more years. For example, the time periods can span anni (1-year periods), lustra (5-year periods), decades (10-year periods), scores (20-year periods), quarter-centuries (25-year periods), half-centuries (50-year periods), and centuries (100-year periods). A decade-based TLM for the 1950s can calculate the probability that a sequence of m words $P(w_1, \ldots, w_m)$ was written during the 1950s (i.e., 1950-1959). The remainder of this document assumes that the TLM time periods are 10 years in length (i.e., decades). In one embodiment, the TLM time periods do not overlap. If the time periods are decades and do not overlap, then the set of TLMs 124 could include a TLM for the 1900s (1900-1909), a TLM for the 1910s (1910-1919), a TLM for the 1920s (1920-1929), etc. In another embodiment, the TLM time periods do overlap. If the time periods are 1-years and do overlap, then the set of TLMs 124 could include a TLM for 1900-1910, a TLM for 1905-1915, a TLM for 1910-1920, a TLM for 1915-1925, etc.

The book analysis data 126 includes various types of information concerning the books having text in the book text data 122. Each type of information concerns a single book. In one embodiment, the book analysis data 126 includes probabilities, derived data, characteristics, and graphs. The probabilities characterize a book on a page-by-page basis. One page of the book is associated with multiple probabilities, namely, the probabilities that the sequence of words on that page was written during various different time periods (e.g., different decades).

Table 1 contains an example of the probabilities in the book analysis data 126 for one particular book. In Table 1, each row represents one time period (e.g., one year), and each column represents a particular page from the book (e.g., page 5). The probability value located at the intersection of row (time period) X and column (page) Y is the probability that the sequence of words on page Y was written during time period X.

TABLE 1

| Year | 5 | 83 | 156 | 225 | 294 | 364 | 436 | 507 | 577 | 647 | 716 |
|---|---|---|---|---|---|---|---|---|---|---|---|
| 2000 | 0 | .1 | .1 | .1 | .3 | .1 | .1 | .1 | .1 | .1 | .1 |
| 1975 | 0 | .3 | .2 | .1 | .4 | .1 | .1 | .1 | .1 | .1 | .1 |
| 1950 | .1 | .3 | .1 | .3 | .3 | .2 | .2 | .1 | .1 | .1 | .1 |
| 1925 | 0 | .1 | .1 | .1 | .1 | .1 | .1 | .1 | .1 | .1 | .1 |
| 1900 | 0 | .1 | .1 | 0 | .1 | 0 | .1 | 0 | .1 | .1 | .1 |
| 1875 | 0 | .1 | 0 | .1 | 0 | 0 | 0 | .1 | .1 | .1 | .1 |
| 1850 | .1 | .1 | 0 | 0 | 0 | 0 | 0 | 0 | .1 | .1 | .1 |
| 1825 | .1 | .1 | 0 | 0 | 0 | 0 | 0 | .1 | .1 | .1 | .1 |
| 1800 | .1 | .4 | 0 | .1 | 0 | .1 | .1 | .1 | .1 | .1 | .1 |
| 1775 | .3 | .1 | 0 | .1 | .1 | .1 | .1 | .1 | .1 | .1 | .3 |
| 1750 | .1 | 0 | 0 | .1 | .1 | .1 | .1 | .1 | 0 | .1 | .1 |
| 1725 | .1 | 0 | 0 | .1 | .1 | .1 | .1 | .1 | .1 | .2 | .1 |
| 1700 | .1 | 0 | .1 | .1 | .1 | .1 | .1 | .2 | .2 | .1 | .1 |
| 1675 | 0 | 0 | 0 | .0 | 0 | 0 | 0 | 0 | 0 | 0 | 0 |
| 1650 | 0 | 0 | 0 | 0 | 0 | 0 | 0 | 0 | 0 | 0 | 0 |
| 1625 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 |

The derived data in the book analysis data 126 are calculated based on the probabilities in the book analysis data 126. One type of derived data is the time period with the maximum probability. This type of data, referred to as max-likelihood-date, is associated with one particular page.

Table 2 contains an example of the probabilities and the derived data in the book analysis data 126 for one particular book. Table 2 is equivalent to Table 1 except that one row has been added (at the very bottom) for the max-likelihood-date.

TABLE 2

| Year | 5 | 83 | 156 | 225 | 294 | 364 | 436 | 507 | 577 | 647 | 716 |
|---|---|---|---|---|---|---|---|---|---|---|---|
| 2000 | 0 | .1 | .1 | .1 | .3 | .1 | .1 | .1 | .1 | .1 | .1 |
| 1975 | 0 | .3 | .2 | .1 | .4 | .1 | .1 | .1 | .1 | .1 | .1 |
| 1950 | .1 | .3 | .1 | .3 | .3 | .2 | .2 | .1 | .1 | .1 | .1 |
| 1925 | 0 | .1 | .1 | .1 | .1 | .1 | .1 | .1 | .1 | .1 | .1 |
| 1900 | 0 | .1 | .1 | 0 | .1 | 0 | .1 | 0 | .1 | .1 | .1 |
| 1875 | 0 | .1 | 0 | .1 | 0 | 0 | 0 | .1 | .1 | .1 | .1 |
| 1850 | .1 | .1 | 0 | 0 | 0 | 0 | 0 | 0 | .1 | .1 | .1 |
| 1825 | .1 | .1 | 0 | 0 | 0 | 0 | 0 | .1 | .1 | .1 | .1 |
| 1800 | .1 | .4 | .1 | .1 | 0 | .1 | .1 | .1 | .1 | .1 | .1 |
| 1775 | .3 | .1 | 0 | .1 | .1 | .1 | .1 | .1 | .1 | .1 | .3 |
| 1750 | .1 | 0 | 0 | .1 | .1 | .1 | 0 | .1 | 0 | .1 | .1 |
| 1725 | .1 | 0 | 0 | .1 | .1 | .1 | .1 | .1 | .1 | .2 | .1 |
| 1700 | .1 | 0 | .1 | .1 | .1 | .1 | .1 | .2 | .2 | .1 | .1 |
| 1675 | 0 | 0 | 0 | 0 | 0 | 0 | 0 | 0 | 0 | 0 | 0 |
| 1650 | 0 | 0 | 0 | 0 | 0 | 0 | 0 | 0 | 0 | 0 | 0 |
| 1625 | 0 | 0 | 0 | 0 | 0 | 0 | 0 | 0 | 0 | 0 | 0 |
| 1600 | 0 | 0 | 0 | 0 | 0 | 0 | 0 | 0 | 0 | 0 | 0 |
| max-likelihood-date | 1775 | 1800 | 1975 | 1950 | 1975 | 1950 | 1950 | 1700 | 1700 | 1725 | 1775 |

Another type of derived data is the number of pages for each time period where that time period is each page's max-likelihood-date. This type of data, referred to as aggregated-max-likelihood-dates, is associated with one particular book.

Table 3 contains an example of the aggregated-max-likelihood-dates calculated based on the data in Table 1 and/or Table 2.

TABLE 3

| Year | Number of Pages |
|---|---|
| 2000 | 0 |
| 1975 | 2 |
| 1950 | 3 |
| 1925 | 0 |
| 1900 | 0 |
| 1875 | 0 |
| 1850 | 0 |
| 1825 | 0 |
| 1800 | 1 |
| 1775 | 2 |
| 1750 | 0 |
| 1725 | 1 |
| 1700 | 2 |
| 1675 | 0 |
| 1650 | 0 |
| 1625 | 0 |
| 1600 | 0 |

The characteristics in the book analysis data 126 are calculated based on the derived data in the book analysis data 126. One type of characteristic is whether the book has a foreword and/or an afterword. Another type of characteristic is whether the book is a "bound-with" book. A "bound-with" book is a work that contains two or more titles. One example of a bound-with book is two complete novels that have been bound together. One type of bound-with book includes titles that were published separately and then bound together later into one volume (e.g., by a library). Another type of bound-with book includes titles that were bound together at publication (e.g., by a publisher as a multi-work volume).

The characteristics of a book can be used to check the accuracy of that book's publication date (e.g., as included in provided metadata regarding the book) and correct the publication date if necessary. Book metadata, such as publication date, are often provided by libraries (in the form of catalogs) and publishers and supplemented with information in bibliographic databases. The publication date is often wrong due to human error (e.g., the person who catalogued the book), a multi-volume work such as a periodical or serial (where the publication date of the first issue is used as the publication date for all issues), and the use of placeholder data (e.g., using 1899 as the publication date when the actual publication date is unknown). Relying on an incorrect publication date can result in assuming that a book is in the public domain when the book is actually still protected by copyright law.

The graphs in the book analysis data 126 represent graphically the probabilities and/or the derived data in the book analysis data 126. A first type of graph is a "book date profile," which shows the max-likelihood-date information for various pages within a single book (e.g., the information in the max-likelihood-date row of Table 2). A book date profile can be, for example, a bar graph. A second type of graph is a "book date histogram," which shows the aggregated-max-likelihood-dates information for various time periods and a single book (e.g., the information in Table 3). A book date histogram can be, for example, a bar graph.

Figure 6:
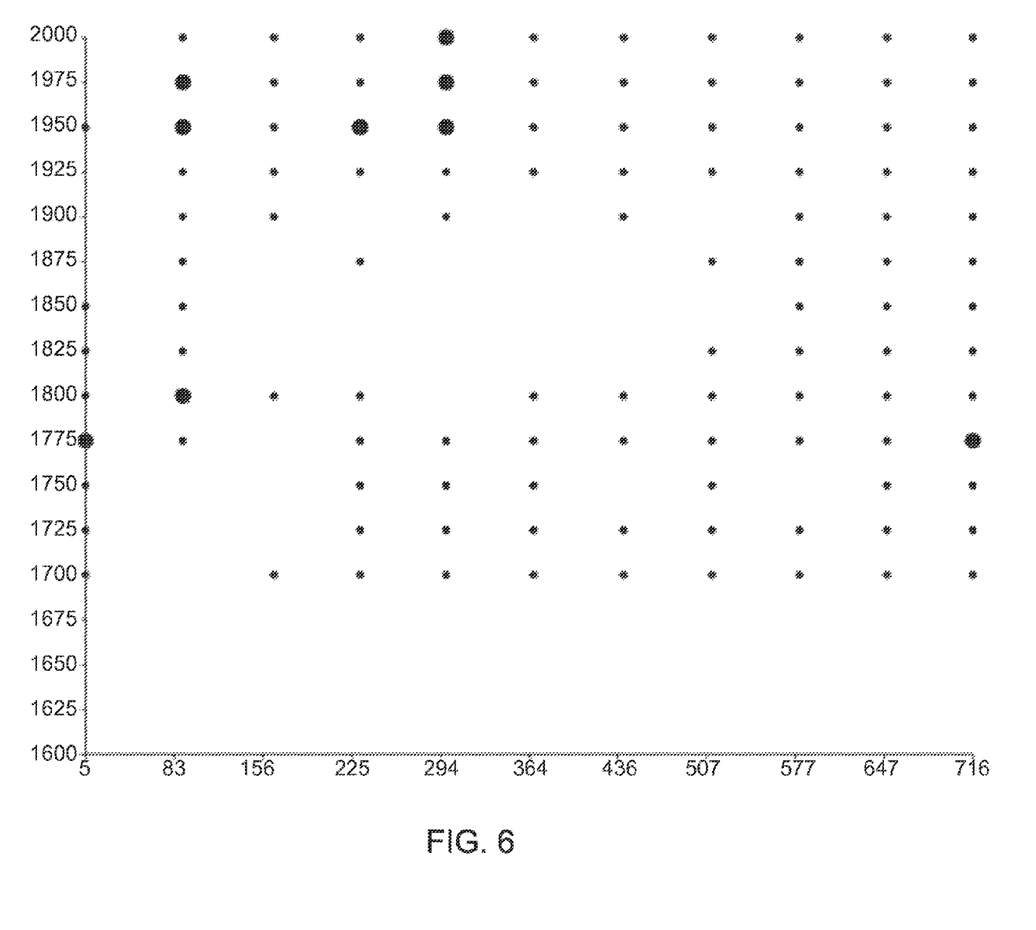
FIG. 6 is an alternate representation of the probability values shown in Table 1 according to one embodiment.

A third type of graph is a "book scatter profile," which shows the probabilities for various pages within a single book (e.g., the information in Table 1). Whereas Table 1 contains numbers (probability values) at the intersection of a column and a row, a book scatter profile instead contains dots. The size of the dot represents the probability value, where a larger dot means a larger probability value (i.e., higher probability) and a smaller dot means a smaller probability value (i.e., lower probability). FIG. 6 is a book scatter profile (i.e., an alternate representation) of the probability values shown in Table 1 according to one embodiment.

In one embodiment, a graph stored in the repository 120 as book analysis data 126 can be transferred over the network 110 from the processing server 130 to a client device (not shown). The graph is then presented for display on the client device. In one embodiment, the client device includes a web browser that displays the graph.

The processing server 130 includes various modules such as a page dating module 132 for calculating probabilities and a book analysis module 134 for analyzing these probabilities. In one embodiment, the processing server 130 includes a computer (or set of computers) that communicates with repository 120 and processes data (e.g., by executing the page dating module 132 and the book analysis module 134).

In general, the page dating module 132 calculates the probabilities in the book analysis data 126. The page dating module 132 will be discussed below with reference to FIG. 3.

In general, the book analysis module 134 generates the derived data, characteristics, and graphs in the book analysis data 126. The book analysis module 134 will be discussed below with reference to FIG. 4.

Figure 2:
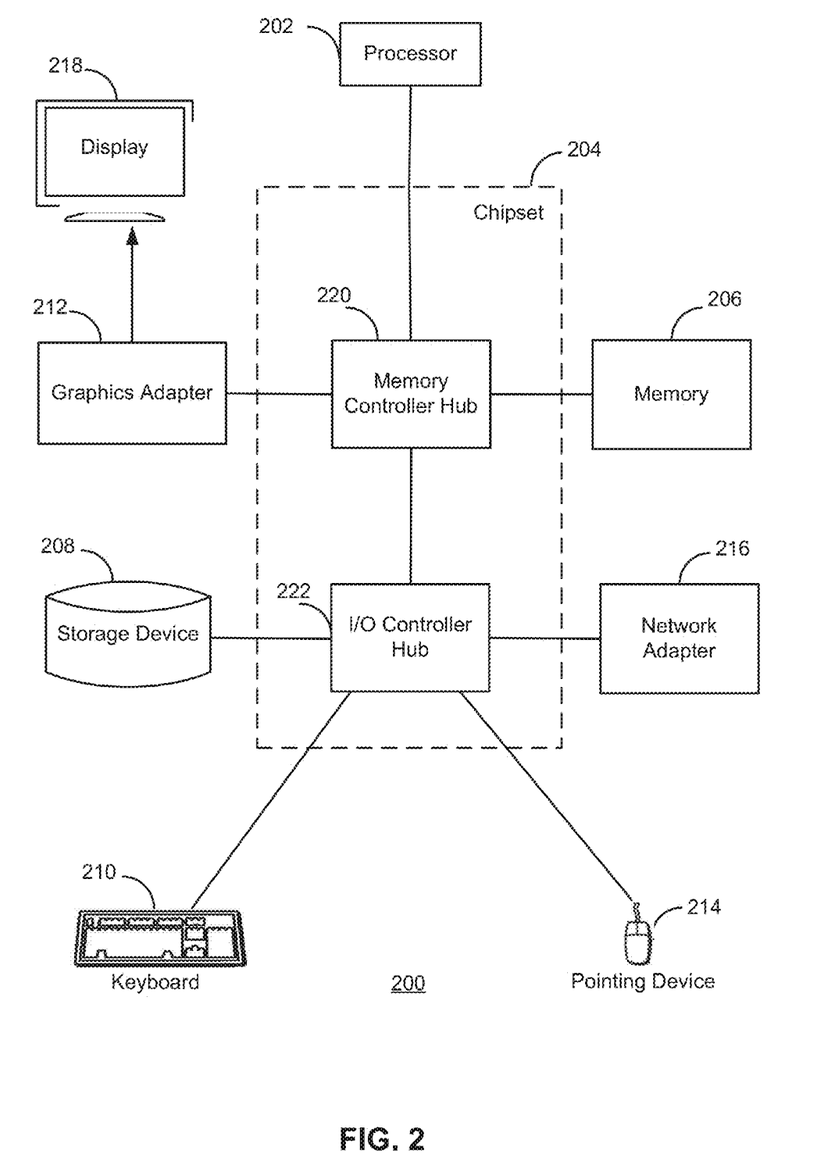
FIG. 2 is a high-level block diagram illustrating an example of a computer for use as a repository and/or a processing server, in accordance with one embodiment.

FIG. 2 is a high-level block diagram illustrating an example of a computer 200 for use as a repository 120 and/or a processing server 130, in accordance with one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120 and/or the processing server 130 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
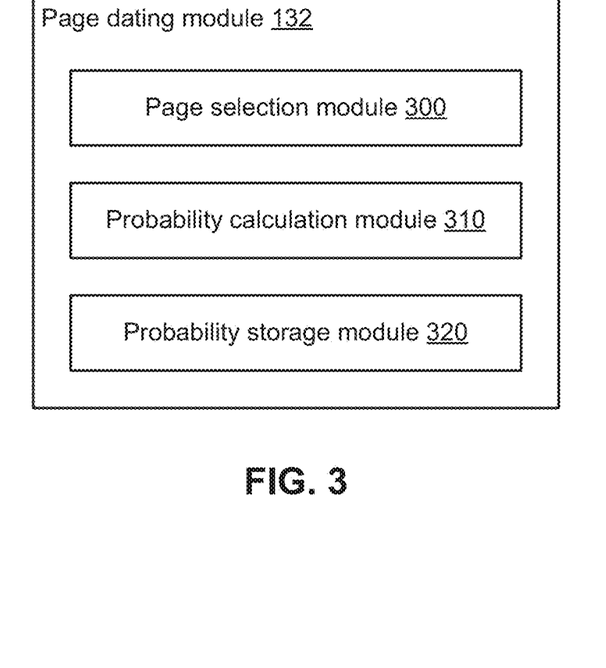
FIG. 3 is a high-level block diagram illustrating a detailed view of the page dating module, according to one embodiment.

FIG. 3 is a high-level block diagram illustrating a detailed view of the page dating module 132, according to one embodiment. The page dating module 132 includes a page selection module 300, a probability calculation module 310, and a probability storage module 320. The page selection module 300 selects pages of a book. The probability calculation module 310 calculates probabilities for each of the selected pages. The probability storage module 320 stores the calculated probabilities in the repository 120. These probabilities can then be analyzed to determine characteristics of the book.

The page selection module 300 selects pages of a book whose text is stored in the repository 120 as book text data 122. The page selection module 300 is configurable and can select all pages of a book or only some of the pages. In one embodiment, a desired number of pages is specified. Selection of particular pages can be performed randomly or can be spread evenly throughout the book. Using a 100-page book as an example, if the desired number of pages is 10 and the page selection is spread evenly, then pages 1, 11, 21, 31, 41, 51, 61, 71, 81, and 91 could be selected (a total of 10 pages). Similarly, pages 10, 20, 30, 40, 50, 60, 70, 80, 90, and 100 could be selected (a total of 10 pages).

In another embodiment, a desired sampling rate is specified. Selection of particular pages can be performed randomly or can be spread evenly throughout the book. Again using a 100-page book as an example, if the desired sampling rate is 5% and the page selection is spread evenly, then pages 1, 21, 41, 61, and 81 could be selected, for a total of 5 pages (5% of the 100 pages). Similarly, pages 20, 40, 60, 80, and 100 could be selected, for a total of 5 pages (5% of the 100 pages).

In yet another embodiment, particular pages are selected based on rules. For example, the first page and/or the last page can always be selected.

In one embodiment, the page selection module 300 can distinguish between pages based on their numbering schemes (e.g., lower-case Roman numerals versus Arabic numerals) and change its operation accordingly. For example, the page selection module 300 can select all pages numbered with lower-case Roman numerals and then sample pages (e.g., at a rate of 10%) numbered with Arabic numerals.

The probability calculation module 310 calculates probabilities for each of the pages selected by the page selection module 300. Specifically, the probability calculation module 310 calculates the probabilities that the sequence of words on a particular page was written during various different time periods (e.g., decades). These time periods are the time periods represented by the TLMs in the set of TLMs 124. In other words, one page of one book is associated with one probability for each TLM (e.g., each decade) in the set of TLMs 124.

Table 1 (discussed above) is an example of the probabilities calculated by the probability calculation module 310. Note that Table 1 includes one row for each time period whose vocabulary characteristics are captured by one TLM (within the set of TLMs 124). The probability calculation module 310 calculates these probabilities using Bayes' rule and statistical language models (SLMs), as explained above.

The probability storage module 320 stores the probabilities calculated by the probability calculation module 310 in the repository 120 as book analysis data 126. These probabilities can then be analyzed to determine characteristics of the book.

Figure 4:
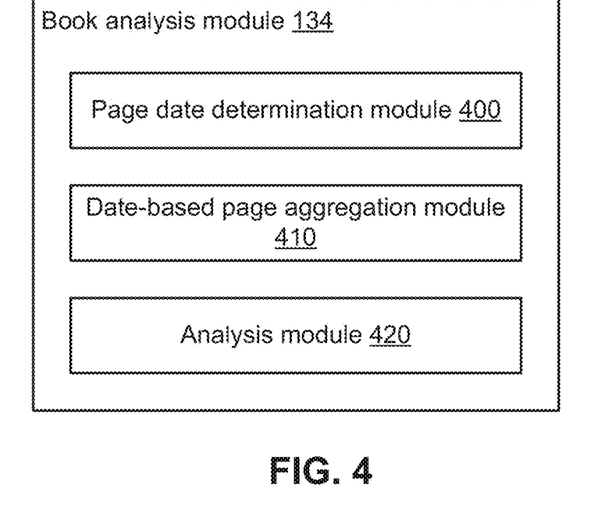
FIG. 4 is a high-level block diagram illustrating a detailed view of the book analysis module, according to one embodiment.

FIG. 4 is a high-level block diagram illustrating a detailed view of the book analysis module 134, according to one embodiment. The book analysis module 134 includes a page date determination module 400, a date-based page aggregation module 410, and an analysis module 420. The page date determination module 400 and the date-based page aggregation module 410 calculate derived data based on probabilities. The analysis module 420 calculates book characteristics based on the derived data and generates graphs based on probabilities and/or the derived data.

The page date determination module 400 calculates derived data based on probabilities that have been stored in the repository 120 (e.g., as book analysis data 126). Specifically, the page date determination module 400 calculates one max-likelihood-date (the time period with the maximum probability) for each page of a book for which probabilities have been stored in the repository 120. The page date determination module 400 then stores the max-likelihood-dates in the repository 120 as book analysis data 126.

Using Table 1 (discussed above) as an example, the max-likelihood-date for a particular page can be determined by first determining the maximum value within one column of Table 1 (i.e., the column that corresponds to that particular page) and then determining the time period associated with that maximum value. Table 2 includes the probabilities from Table 1 and a max-likelihood date for each page (see the max-likelihood-date row).

The date-based page aggregation module 410 calculates derived data based on probabilities that have been stored in the repository 120 (e.g., as book analysis data 126). Specifically, the date-based page aggregation module 410 calculates aggregated-max-likelihood-dates (the number of pages for each time period where that time period is each page's max-likelihood-date) for one book for which probabilities have been stored in the repository 120. The date-based page aggregation module 410 then stores the aggregated-max-likelihood-dates in the repository 120 as book analysis data 126.

Using Table 2 (discussed above) as an example, the aggregated-max-likelihood-dates for a particular book can be determined by counting the number of occurrences (number of columns/pages) of each time period in the max-likelihood-date row. Table 3 (discussed above) contains an example of the aggregated-max-likelihood-dates calculated based on the data in Table 1 and/or Table 2.

The analysis module 420 calculates book characteristics based on the derived data and generates graphs based on probabilities and/or the derived data. The analysis module 420 then stores the characteristics and/or graphs in the repository 120 as book analysis data 126.

In one embodiment, the analysis module 420 analyzes the max-likelihood-dates associated with the pages of a particular book according to a set of heuristics. The heuristics distinguish between commonly-found arrangements of text. One commonly-found arrangement of text is a main body of text accompanied by a foreword and/or an afterword. A foreword includes prefatory comments, often written by someone other than the author of the main portion of a book. Forewords and afterwords are often written during different time periods (specifically, later in time) than when the main bodies of the corresponding books were written. Also, forewords and afterwords are often significantly shorter (i.e., contain fewer pages) than the main bodies of the corresponding books.

Another commonly-found arrangement of text is a "bound-with" book. A "bound-with" book is a work that contains two or more titles. One example of a bound-with book is two complete novels that have been bound together. "Bound-with" titles are often written during different time periods. The titles in a bound-with book are often similar in size (i.e., contain a similar number of pages), as contrasted with forewords and afterwords (which are often significantly shorter than the main bodies of the corresponding books).

Since the book analysis data 126 stored in the repository 120 includes the probabilities that the sequence of words on a particular page was written during various different time periods (e.g., decades), a determination can be made regarding whether a book contains a foreword and/or an afterword and whether a book is a "bound-with" book.

The heuristics are based on max-likelihood-dates that are ordered according to their associated pages, from the first page for which a max-likelihood-date is available to the last page for which a max-likelihood-date is available. One heuristic states that if all of the max-likelihood-dates are identical or close-in-time (e.g., within a specified threshold time range), then the book does not contain a foreword, does not contain an afterword, and is not a "bound-with" book. This heuristic is based on the fact that 1) forewords and afterwords are often written during different time periods than when the main bodies of the corresponding books were written and 2) bound-with titles are often written during different time periods.

If the max-likelihood-dates are neither identical nor close-in-time, then the analysis module 420 groups consecutive pages together that have identical or close-in-time (e.g., within a specified threshold time range) max-likelihood-dates. This results in, for example, a first group of pages with a max-likelihood-date X and a second group of pages with a max-likelihood-date Y, where X and Y are neither identical nor close-in-time. Each group of pages is associated with a "page span," which represents the range of page numbers represented by a group. For example, a group that includes pages numbered 1, 5, 10, and 15 would have a page span of 14 (15-1).

Another heuristic states that if the page span of the first group is identical or similar (e.g., within a specified range) in size to the page span of the second group, then the book is a "bound-with." This heuristic is based on the fact that titles in a bound-with book are often similar in size (i.e., contain a similar number of pages), as contrasted with forewords and afterwords (which are often significantly shorter than the main bodies of the corresponding books). An example of this situation is a book that contains two novels, where the first group of pages corresponds to the first novel, and the second group of pages corresponds to the second novel.

Another heuristic states that if the page span of the first group is much smaller than the page span of the second group (e.g., if the page span of the second group exceeds the page span of the first group by a threshold amount), then the first group is a foreword and the second group is the main body of the book. This heuristic is based on the fact that a foreword precedes the main body of the corresponding book (i.e., the page numbers are smaller) and is often significantly shorter (i.e., contains fewer pages) than the main body of the corresponding book.

Another heuristic states that if the page span of the first group is much larger than the page span of the second group (e.g., if the page span of the first group exceeds the page span of the second group by a threshold amount), then the analysis module 420 determines that the first group is the main body of the book and the second group is an afterword. This heuristic is based on the fact that an afterword succeeds the main body of the corresponding book and is often significantly shorter (i.e., contains fewer pages) than the main body of the corresponding book.

In another embodiment, the analysis module 420 compares the max-likelihood-date of the first group with the max-likelihood-date of the second group. Another heuristic states that if the page span of the first group is much smaller than the page span of the second group and if the first group's max-likelihood-date is later than the second group's max-likelihood-date, then the first group is a foreword and the second group is the main body of the book. This heuristic is based on the fact that a foreword precedes the main body of the corresponding book (i.e., the page numbers are smaller), is often significantly shorter (i.e., contains fewer pages) than the main body of the corresponding book, and is often written later in time than the main body of the corresponding book.

Another heuristic states that if the page span of the first group is much larger than the page span of the second group and if the first group's max-likelihood-date is earlier than the second group's max-likelihood-date, then the first group is the main body of the book and the second group is an afterword. This heuristic is based on the fact that an afterword succeeds the main body of the corresponding book, is often significantly shorter (i.e., contains fewer pages) than the main body of the corresponding book, and is often written later in time than the main body of the corresponding book.

Note that the analysis module 420 can apply more than one of these heuristics to the same book. For example, when the analysis module 420 groups consecutive pages together that have identical or close-in-time max-likelihood-dates, this could result in five groups: a preface, an afterword, and a "bound-with" portion that includes three titles (groups). Each of these five groups could be associated with different max-likelihood-dates.

In yet another embodiment, the analysis module 420 generates graphs that represent graphically the probabilities and/or the derived data in the book analysis data 126. Three types of graphs were introduced above with reference to the book analysis data 126: a "book date profile" (shows the max-likelihood-date information for various pages within a single book), a "book date histogram" (shows the aggregated-max-likelihood-dates information for various time periods and a single book), and a "book scatter profile" (shows the probabilities for various pages within a single book as dots).

A graph generated by the analysis module 420 conveys information about a book and its characteristics (e.g., whether the book has a foreword and/or an afterword and whether the book is a "bound-with"). A graph can be analyzed manually (e.g., by a human being looking at the graph while the graph is being presented for display by a client device) or automatically (e.g., by a module such as the analysis module 420).

Figure 7:
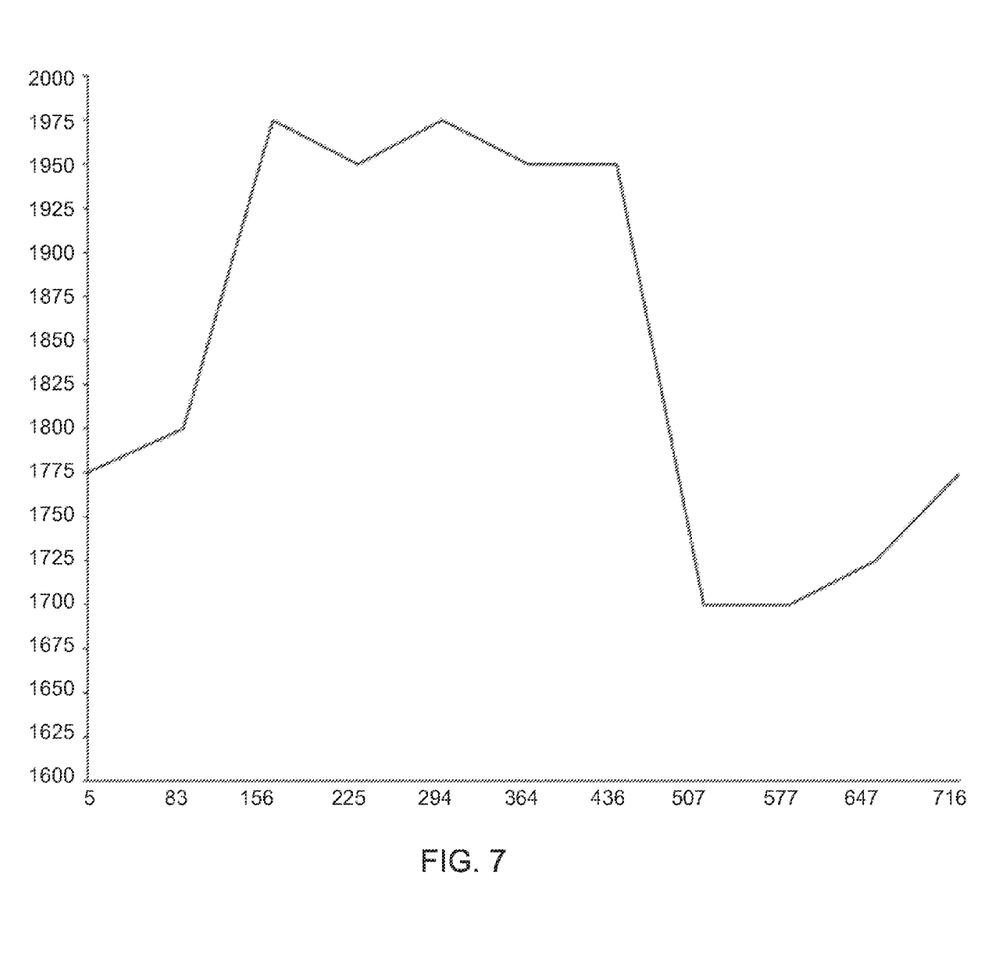
FIG. 7 is an exemplary book date profile according to one embodiment.

FIG. 7 is an exemplary book date profile according to one embodiment. The book date profile in FIG. 7 shows the max-likelihood-date information for various pages within a single book in the form of a line graph. The book date profile in FIG. 7 shows that the book includes older content at the beginning (at pages 5 and 83, which correspond to the years 1775 and 1800, respectively), newer content in the middle (at pages 156, 225, 294, 364, and 436, which correspond to the years 1975, 1950, 1975, 1950, and 1950, respectively), and older content at the end (at pages 507, 577, 647, and 716, which correspond to the years 1700, 1700, 1725, and 1775, respectively).

Figure 8:
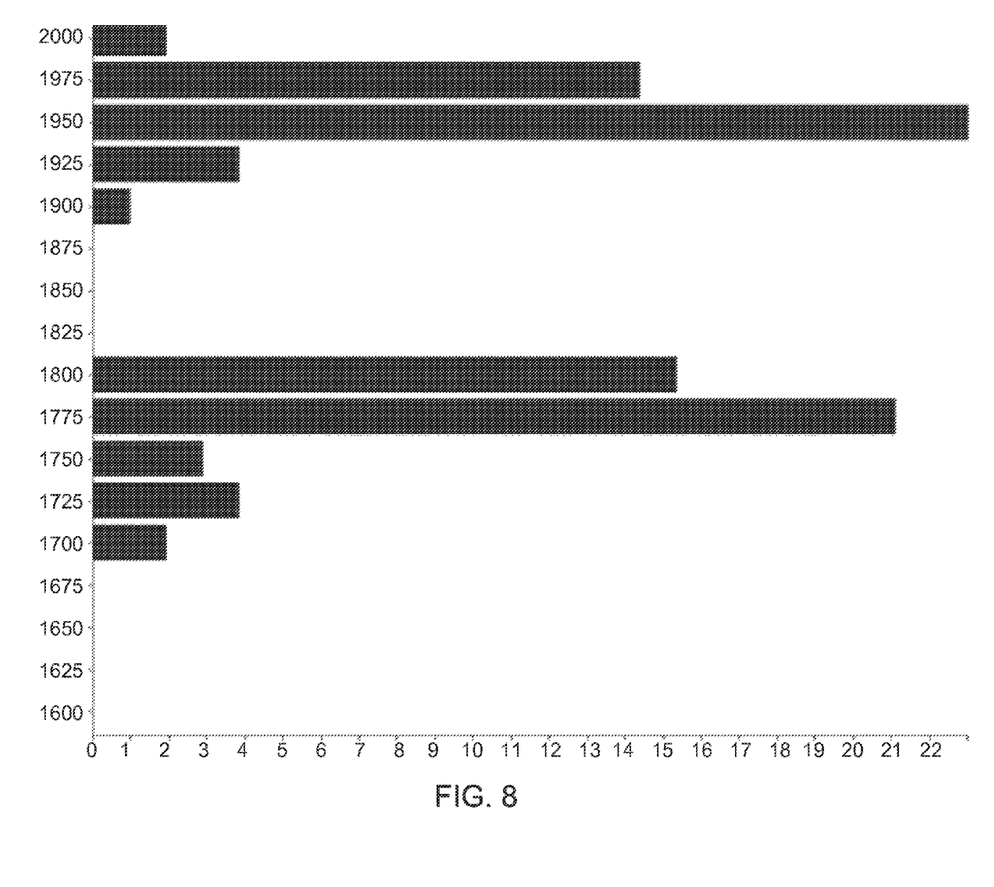
FIG. 8 is an exemplary book date histogram according to one embodiment.

FIG. 8 is an exemplary book date histogram according to one embodiment. The book date histogram in FIG. 8 shows the aggregated-max-likelihood-dates information for various time periods and a single book in the form of a bar graph. The book date histogram in FIG. 8 shows that the book includes a first set of content written circa 1900-2000 (approximately 44 pages) and a second set of content written circa 1700-1800 (approximately 45 pages). Based on this graph, it is likely that the book includes source material that was written during the 1700-1800 time period and accompanying content that was written during the 1900-2000 time period and that perhaps describes the source material.

Figure 5:
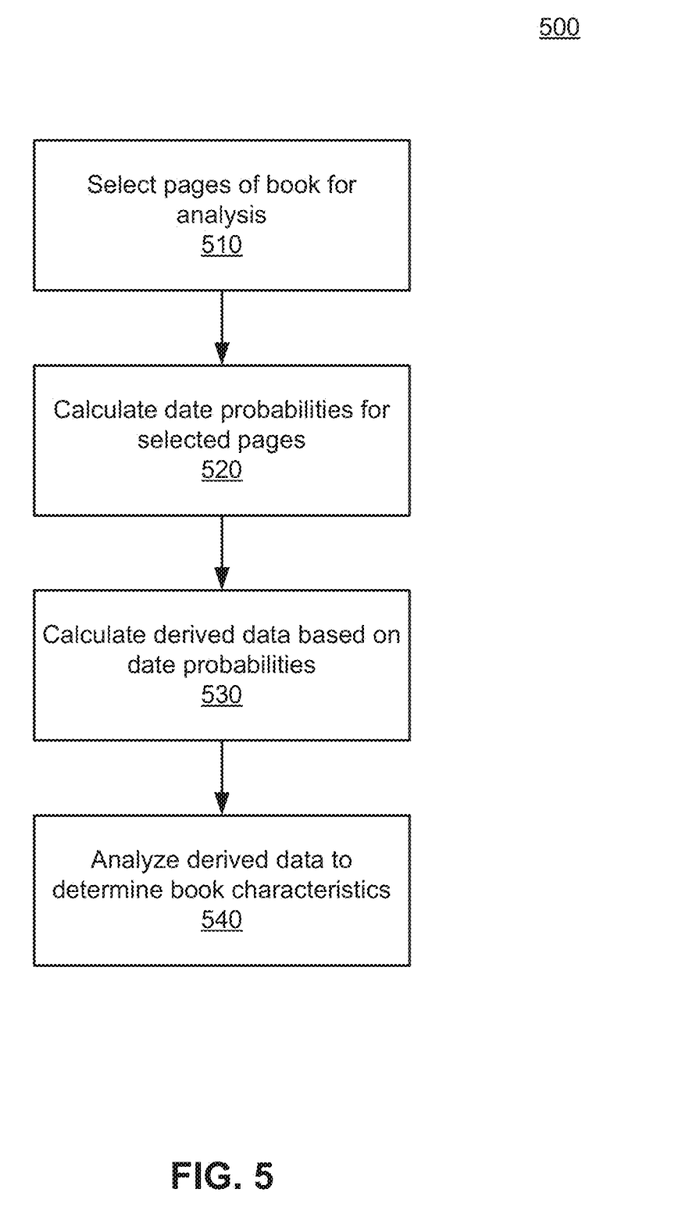
FIG. 5 is a flowchart illustrating a method of determining characteristics of a book according to one embodiment.

FIG. 5 is a flowchart illustrating a method 500 of determining characteristics of a book according to one embodiment. Other embodiments can perform the steps in different orders and can include different and/or additional steps. In addition, some or all of the steps can be performed by entities other than those shown in FIG. 1.

When the method 500 starts, the text of a paginated book has already been stored as book text data 122 in the repository 120. Also, trained temporal language models (TLMs) have already been stored as a set of TLMs 124 in the repository 120.

In step 510, pages of the book are selected for analysis. For example, the page selection module 300 (part of the page dating module 132) selects either all pages or only particular pages of the paginated book whose text is stored as book text data 122 in the repository 120.

In step 520, date probabilities are calculated for the selected pages. For example, the probability calculation module 310 (part of the page dating module 132) calculates, for each page that was selected during step 510, the probabilities that the sequence of words on that particular page was written during various different time periods (e.g., decades). The probability storage module 320 (part of the page dating module 132) stores the calculated date probabilities as book analysis data 126 within the repository 120.

In step 530, derived data are calculated based on the date probabilities that were calculated during step 520. For example, the page date determination module 400 (part of the book analysis module 134) calculates one max-likelihood-date for each page of the book for which probabilities have been stored as book analysis data 126 within the repository 120. The page date determination module 400 then stores the max-likelihood-dates in the repository 120 as book analysis data 126. The date-based page aggregation module 410 (part of the book analysis module 134) calculates aggregated-max-likelihood-dates for the book for which probabilities have been stored as book analysis data 126 within the repository 120. The date-based page aggregation module 410 then stores the aggregated-max-likelihood-dates in the repository 120 as book analysis data 126.

In step 540, the derived data are analyzed to determine characteristics of the book. For example, the analysis module 420 (part of the book analysis module 134) analyzes the max-likelihood-dates associated with the pages of the book according to a set of heuristics. The heuristics distinguish between commonly-found arrangements of text (e.g., a main body of text accompanied by a foreword and/or an afterword and a "bound-with" book), as explained above. Optionally, the analysis module 420 can generate a graph that represents graphically the probabilities and/or the derived data in the book analysis data 126 (e.g., a book date profile, a book date histogram, or a book scatter profile). The analysis module 420 can analyze the graph or the graph can be analyzed manually.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method of determining characteristics of a book, the method comprising:
    accessing a non-transitory computer-readable storage medium storing a plurality of maximum-likelihood dates associated with text pages within the book, wherein a maximum-likelihood date for a text page indicates a time period during which that text page was most likely to have been written;
    ordering the plurality of maximum-likelihood dates according to the maximum-likelihood dates' associated text pages, from a first text page for which a maximum-likelihood date is available to a last text page for which a maximum-likelihood date is available; and
    analyzing the ordered plurality of maximum-likelihood dates according to a heuristic to determine characteristics regarding arrangements of text pages within the book, wherein the analyzing comprises determining whether maximum-likelihood dates associated with consecutive text pages are within a threshold time range.

2. The computer-implemented method of claim 1, wherein the heuristic indicates that if all of the plurality of maximum-likelihood dates associated with the consecutive text pages are within the threshold time range, then the arrangement of text pages within the book indicates that the book does not contain a foreword.

3. The computer-implemented method of claim 1, wherein the heuristic indicates that if all of the plurality of maximum-likelihood dates associated with the consecutive text pages are within the threshold time range, then the arrangement of text pages within the book indicates that the book does not contain an afterword.

4. The computer-implemented method of claim 1, wherein the heuristic indicates that if all of the plurality of maximum-likelihood dates associated with the consecutive text pages are within the threshold time range, then the arrangement of text pages within the book indicates that the book does not contain multiple titles.

5. The computer-implemented method of claim 1, wherein the plurality of maximum-likelihood dates was determined using a temporal language model.

6. The computer-implemented method of claim 1, further comprising:
    generating a graph that represents the ordered plurality of maximum-likelihood dates, wherein a first axis of the graph represents text pages, and wherein a second axis of the graph represents maximum-likelihood dates; and
    presenting the graph for display on a client device via a network.

7. The computer-implemented method of claim 1, further comprising using determined characteristics regarding arrangements of text pages within the book to check accuracy of a given publication date of the book.

8. The computer-implemented method of claim 1, further comprising aggregating the plurality of maximum-likelihood dates to determine a number of text pages for each maximum-likelihood date where that maximum-likelihood date is each page's maximum-likelihood date.

9. The computer-implemented method of claim 8, further comprising:
    generating a graph that represents the aggregated plurality of maximum-likelihood dates, wherein a first axis of the graph represents numbers of text pages, and wherein a second axis of the graph represents maximum-likelihood dates; and
    presenting the graph for display on a client device via a network.

10. The computer-implemented method of claim 1, further comprising:
    within the plurality of maximum-likelihood dates ordered according to their associated text pages, grouping consecutive text pages having maximum-likelihood dates that are within the threshold time range, wherein text pages in a first group precede text pages in a second group within the book; and
    determining page spans for the groups, wherein a page span for a group indicates a range of page numbers represented by the group.

11. The computer-implemented method of claim 10, wherein the heuristic indicates that if a page span of the first group is similar in size to a page span of the second group, then the arrangement of text pages within the book indicates that the book contains multiple titles.

12. The computer-implemented method of claim 10, wherein the heuristic indicates that if a page span of the second group exceeds a page span of the first group by a threshold amount, then the arrangement of text pages within the book indicates that the first group comprises a foreword of the book and the second group comprises a main body of the book.

13. The computer-implemented method of claim 10, wherein the heuristic indicates that if a page span of the first group exceeds a page span of the second group by a threshold amount, then the arrangement of text pages within the book indicates that the first group comprises a main body of the book and the second group comprises an afterword of the book.

14. The computer-implemented method of claim 10, wherein the heuristic indicates that if a page span of the second group exceeds a page span of the first group by a threshold amount and if a maximum-likelihood date of the first group is later than a maximum-likelihood date of the second group, then the arrangement of text pages within the book indicates that the first group comprises a foreword of the book and the second group comprises a main body of the book.

15. The computer-implemented method of claim 10, wherein the heuristic indicates that if a page span of the first group exceeds a page span of the second group by a threshold amount and if a maximum-likelihood date of the first group is earlier than a maximum-likelihood date of the second group, then the arrangement of text pages within the book indicates that the first group comprises a main body of the book and the second group comprises an afterword of the book.

16. A non-transitory computer-readable storage medium storing computer program instructions executable by a processor for determining characteristics of a book, the instructions when executed by the processor performing steps comprising:

accessing a non-transitory computer-readable storage medium storing a plurality of maximum-likelihood dates associated with text pages within the book, wherein a maximum-likelihood date for a text page indicates a time period during which that text page was most likely to have been written;

ordering the plurality of maximum-likelihood dates according to their associated text pages, from a first text page for which a maximum-likelihood date is available to a last text page for which a maximum-likelihood date is available; and     analyzing the ordered plurality of maximum-likelihood dates according to a heuristic to determine characteristics regarding arrangements of text pages within the book, wherein the analyzing comprises determining whether maximum-likelihood dates associated with consecutive text pages are within a threshold time range.

17. The computer-readable storage medium of claim 16, wherein the heuristic indicates that if all of the plurality of maximum-likelihood dates associated with the consecutive text pages are within the threshold time range, then the arrangement of text pages within the book indicates that the book does not contain a foreword.

18. The computer-readable storage medium of claim 16, wherein the instructions further perform steps comprising:

within the plurality of maximum-likelihood dates ordered according to their associated text pages, grouping consecutive text pages having maximum-likelihood dates that are within the threshold time range, wherein text pages in a first group precede text pages in a second group within the book; and     determining page spans for the groups, wherein a page span for a group indicates a range of page numbers represented by the group.

19. The computer-readable storage medium of claim 18, wherein the heuristic indicates that if a page span of the second group exceeds a page span of the first group by a threshold amount, then the arrangement of text pages within the book indicates that the first group comprises a foreword of the book and the second group comprises a main body of the book.

20. A computer system for determining characteristics of a book, comprising:

at least one non-transitory computer-readable storage medium storing computer program instructions executable by a processor, the instructions when executed by the processor performing steps comprising:

accessing a non-transitory computer-readable storage medium storing a plurality of maximum-likelihood dates associated with text pages within the book, wherein a maximum-likelihood date for a text page indicates a time period during which that text page was most likely to have been written;

ordering the plurality of maximum-likelihood dates according to their associated text pages, from a first text page for which a maximum-likelihood date is available to a last text page for which a maximum-likelihood date is available; and         analyzing the ordered plurality of maximum-likelihood dates according to a heuristic to determine characteristics regarding arrangements of text pages within the book, wherein the analyzing comprises determining whether maximum-likelihood dates associated with consecutive text pages are within a threshold time range; and     the processor for executing the computer program instructions.

* * * * *